United States Patent Office 3,126,380
Patented Mar. 24, 1964

3,126,380
BASIC ETHERS OF 1,1'-BIS-SPIRO-INDANE COMPOUNDS AND PROCESS OF MAKING SAME
Leonhard Schuler, Heidelberg, Germany, assignor to Knoll A.-G. Chemische Fabriken, Ludwigshafen (Rhine), Germany, a corporation of Germany
No Drawing. Filed Aug. 22, 1961, Ser. No. 133,063
9 Claims. (Cl. 260—247.5)

The present invention relates to new and valuable basic ethers and more particularly to basic ethers of bis-spiro-indane compounds, and to a process of producing same.

It is one object of the present invention to provide new and valuable basic ethers of bis-spiro-indane compounds which are therapeutically useful for their prolonged blood pressure-reducing effects.

Another object of the present invention is to provide a simple and effective process of producing such new and valuable bis-spiro-indane compounds.

A further object of the present invention is to provide highly effective hypotensive compositions containing such bis-spiro-indane compounds.

Other objects and advantageous features of the present invention will become apparent as the description proceeds.

The new and valuable basic ethers of bis-spiro-indane compounds according to the present invention are compounds of the following Formula I:

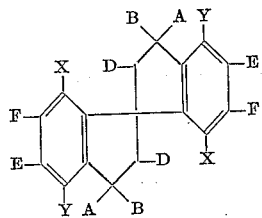

In said formula

A and B indicate lower alkyl and especially methyl or ethyl;
X and Y indicate hydrogen, chlorine, or bromine;
D indicates hydrogen or methyl; and
E and F indicate lower alkyl and especially methyl, hydroxyl, alkoxy, preferably lower alkoxy and at least one of the E and F substituents in each indane half of the molecule being an aminoalkoxy group of the formula

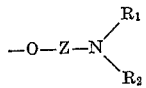

wherein

Z is a straight-chain or branched lower alkylene radical, and
$R_1$ and $R_2$ are lower alkyl or, $R_1$ and $R_2$ together with the nitrogen atom to which they are attached, forming a mononuclear heterocyclic ring, which may be alkyl substituted, such as the pyrrolidine, piperidine, morpholine, piperazine, N-alkyl piperazine ring, the corresponding substituents A, B, X, Y, E, and F in each half of the bis-spiro-indane molecule being identical while the substituents D may differ from each other.

The acid addition salts of said new bis-spiro-indane compounds as well as their quaternary ammonium compounds are also useful hypotensive agents.

The new basic ethers of bis-spiro-indane compounds according to the present invention are prepared, for instance, by reacting the corresponding bis-spiro-indane alcohols of the Formula II:

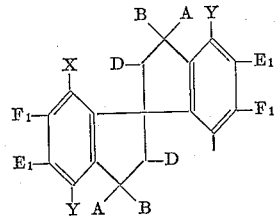

wherein

A, B, C, D, X, and Y represent the same substituents as indicated above, and
$E_1$ and $F_1$ indicate methyl, hydroxyl, or alkoxy, at least one of the E and F substituents of each indane moiety being hydroxyl, and the corresponding substituents A, B X, Y, $E_1$, and $F_1$ in each half of the bis-spiro-indane molecule being identical, as such or in the form of their alkali metal phenolates with reactive esters of amino alcohols of the Formula III

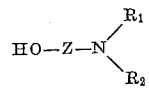

wherein

Z is a straight-chain or branched lower alkylene radical, and
$R_1$ and $R_2$ are lower alkyl or, $R_1$ and $R_2$ together with the nitrogen atom to which they are attached, forming a mononuclear heterocyclic ring, which may be alkyl substituted, such as the pyrrolidine, piperidine, morpholine, piperazine, N-alkyl piperazine ring.

The resulting basic ethers of bis-spiro-indane compounds of Formula I may be converted, if desired, into their acid addition salts with pharmaceutically acceptable acids which are substantially non-toxic in the doses administered, or into their quaternary ammonium compounds.

As stated above, the new basic ethers of bis-spiro-indane compounds of Formula I or their acid addition salts and quaternary ammonium compounds are valuable antihypertensive agents which exert a prolonged blood pressure-reducing effect even on administration of small doses thereof.

The hydroxy bis-spiro-indane compounds of Formula II as they are used as starting material are obtained according to methods known per se by condensing the corresponding phenols with acetone, methyl ethyl ketone, or diethyl ketone as described, for instance, by Wilson, Baker in Journal of Chemical Society [London], 1934, 1678–1681; 1939, 1421–1424; 1959, 1295–1299.

It is evident from said method of producing the new bis-spiro-indane compounds that the substituents attached to the carbon atoms corresponding to each other in both halves of the double molecule are identical. If symmetric ketones are used, the substituents D are also identical.

The starting materials possess, as a maximum four phenolic hydroxyl groups $E_1$ and $F_1$. All these hydroxyl groups $E_1$ and $F_1$ or either the hydroxyl groups $E_1$ or the hydroxyl groups $F_1$ can be converted into the basic ether groups. As a result thereof, the reaction products may have two or four basic ether groups. When using as starting materials hydroxy bis-spiro-indane compounds of Formula II with four phenolic hydroxyl groups $E_1$ and $F_1$, it is possible to first react one pair of the hydroxyl groups with an ester of an amino alcohol of Formula III and subsequently react the other pair of the hydroxyl groups with an ester of an amino alcohol of Formula III which is different from said first reacted ester. Thereby basic ethers are produced wherein the side-chains

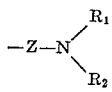

may be of different composition.

The reactive esters of amino alcohols of Formula III are known per se. The preferred esters are the esters with hydrogen halide and preferably the esters with hydrogen chloride or hydrogen bromide.

Etherification of the hydroxy bis-spiro-indane compounds of Formula II is preferably effected in non-alcoholic organic solvents, for instance, in acetone. The preferred procedure is to carry out the reaction in the presence of hydrogen halide-binding agents, such as potassium carbonate, and with the addition of catalytically active amounts of an iodide which is soluble in the reaction mixture. Such catalytically active iodides are, for instance, alkali metal iodides or iodides of organic amines such as tetraethyl ammonium iodide or benzylamine hydriodide.

According to another embodiment of the present invention there may be used, in place of the hydroxy bis-spiro-indanes of Formula II with free phenolic hydroxyl groups, the corresponding alkali metal phenolates for etherification with the reactive esters of the amino alcohols of Formula III. Reaction with the alkali metal phenolates is preferably carried out in suspension in aromatic hydrocarbons such as toluene or xylene.

The reaction mixture is worked up and the desired bis-spiro-indane compound is isolated by repeatedly treating the crude reaction product with acid and alkaline agents of gradually increasing pH-value. As a result of such a treatment chromatographically uniform basic ethers of bis-spiro-indane compounds of the Formula I are obtained.

The following examples serve to illustrate the present invention without, however, being limited thereto.

EXAMPLE 1

*5,6,5',6'-Tetra-(N-Dimethylamino Ethoxy)-3,3,3',3'-Tetramethyl-1,1,'-Bis-Spiro-Indane*

68 g. of 5,6,5',6'-tetrahydroxy-3,3,3',3'-tetramethyl-1,1'-bis-spiro-indane are added to a solution of 18.4 g. of sodium metal in 500 cc. of methanol. Toluene is added to the reaction mixture and the methanol is removed by azeotropic distillation. The resulting sodium phenolate suspension is cooled. 172 g. of N-dimethyl-amino ethylchloride are added while stirring vigorously. Thereafter, the reaction mixture is heated to boiling for about 5 hours while stirring vigorously. Ether is added to dilute the toluene and the precipitated sodium chloride is filtered off. The toluene ether filtrate is washed with water and is repeatedly extracted with small amounts of concentrated hydrochloric acid until the aqueous layer has a pH of 6.0 or lower. The aqueous-acid solution is shaken with a small amount of ether, rendered alkaline by the addition of saturated aqueous potassium carbonate solution, and extracted with ether. The ethereal solution is shaken with dilute sodium hydroxide solution to remove phenolic compounds which have been etherified only partially. After evaporation of the ether and drying of the residue in a vacuum, 5,6,5',6'-tetra-(N-dimethylamino ethoxy)-3,3,3',3'-tetramethyl-1,1'-bis-spiro-indane is obtained in the form of a viscous, lightly colored oil of the boiling point 260° C./0.02 mm. Its trihydrate of the formula $C_{38}H_{60}N_4O_4 \cdot 3 H_2O$ melts at 58° C.

The hydrochloride is obtained by reaction with hydrochloric acid. Its melting point is 282-283° C.

Reaction with 1,5-naphthalene disulfonic acid yields the di-1,5-naphthalene disulfonate of the formula $C_{57}H_{76}N_4O_{16}S_4$. Its melting points is 230-235° C. (with decomposition).

EXAMPLE 2

*5,6,5',6'-Tetra-(N-Diethylamino Ethoxy)-3,3,3',3'-Tetramethyl-1,1'-Bis-Spiro-Indane*

80 g. of 5,6,5',6'-tetrahydroxy-3,3,3',3'-tetramethyl-1,1'-bis-spiro-indane are dissolved in 1 l. of acetone or methyl ethyl ketone. 130 g. of pulverized potassium carbonate and 0.1 g. of sodium iodide as catalyst are added to said solution which is then reacted with 140 g. of diethylamino ethylchloride at boiling temperature for several hours while stirring vigorously. Thereafter, the potassium carbonate and formed potassium chloride are filtered off, the solvent is distilled off, and the residue is dissolved in ether. The ethereal solution is worked up by following the procedure described in Example 1. 5,6,5',6' - tetra - (N - diethylamino ethoxy) - 3,3,3',3'-tetramethyl-1,1'-bis-spiro-indane of the formula $$C_{45}H_{76}O_4N_4$$

obtained in the form of a light oil of the boiling point 250° C./0.005 mm.

The following compounds are obtained by proceeding in an analogous manner as described above:

5,6,5',6' - tetra - (N - morpholino ethoxy) - 3,3,3',3'-tetramethyl-1,1'-bis-spiro-indane of the formula $$C_{45}H_{68}N_4O_8$$

and the boiling point 340° C./0.06 mm. by reacting 5,6,5',6' - tetrahydroxy - 3,3,3',3' - tetramethyl - 1,1'-bis-spiro-indane and N-morpholino ethylchloride hydrochloride.

5,6,5',6' - tetra - (N - diethylamino ethoxy) - 2,3,3'-trimethyl-3,3'-diethyl-1,1'-bis-spiro-indane of the formula $C_{48}H_{82}O_4N_4$ and the boiling point 250–255° C./0.01 mm. which is obtained in the form of a viscous lightly yellowish oil by reacting 5,6,5',6'-tetrahydroxy-2,3,3'-trimethyl-3,3'-diethyl-1,1'-bis-spiro-indane and diethylamino ethylchloride.

6,6'-di-(N-diethylamino ethoxy)-5,5'-dimethoxy-3,3,3',3'-tetramethyl-1,1'-bis-spiro-indane of the formula $$C_{35}H_{54}N_2O_4$$

and the boiling point 300° C./0.005 mm. (with decomposition) which is obtained in the form of a sirupy liquid by reacting 5,5'-dimethoxy-6,6'-dihydroxy-3,3,3',3'-tetramethyl1,1'-bis-spiro-indane and diethylamino ethylchloride.

6,6' - di - (N-diethylamino ethoxy)-3,3,5,3',3',5'-hexamethyl-1,1'-bis-spiro-indane which forms a dihydrochloride of the formula $C_{35}H_{52}N_2O_2 \cdot 2HCl$ and the melting point 185° C. and which is obtained by reacting 6,6'-dihydroxy - 3,3,5,3',3',5'-hexamethyl-1,1'-bis-spiro-indane and diethylamino ethylchloride.

6,6' - di - (N-diethylamino ethoxy)-3,3,5,3',3',5'-hexamethyl-7,7'-dibromo-1,1'-bis-spiro-indane which forms a dihydrochloride of the formula $C_{35}H_{52}N_2O_2Br_2Cl_2$ and the melting point 260° C. and which is obtained by reacting 6,6'-dihydroxy-3,3,5,3',3',5'-hexamethyl-7,7'-dibromo-1,1'-bis-spiro-indane and diethylamino ethylchloride.

EXAMPLE 3

*5,6,5',6'-Tetra-(N-Diethyl-N-Benzylammonium Ethoxy)-3,3,3',3' - Tetramethyl-1,1'-Bis-Spiro-Indane Tetrachloride*

50 g. of 5,6,5',6'-tetra-(N-diethylamino ethoxy)-3,3,3',3'-tetramethyl-1,1'-bis-spiro-indane prepared as described in Example 2, are dissolved in 150 cc. of acetic acid ethyl ester. 38 cc. of benzylchloride are added thereto and the mixture is heated at 100° C. for 20 hours. The resulting amorphous quaternary salt which is first precipitated in the form of a light sirup is purified by dissolving it in water with the addition of ammonia, shaking the solution with ether, treating the ethereal solution with activated charcoal, concentrating the charcoal-treated solution by evaporation, and drying the residue in a vacuum. The compound corresponds to the formula $C_{73}H_{104}N_4O_4Cl_4$ and has the melting point 130–140° C. The corresponding perchlorate is difficultly soluble in water.

In place of benzylchloride, there may be employed equimolecular amounts of benzylbromide, methylchloride, ethylbromide, dimethylsulfate, p-toluene sulfonic acid ethyl ester, or other quaternizing agents, while otherwise quaternization is effected as described hereinabove. It is, of course, understood that quaternary ammonium compounds of other basic ethers of bis-spiro-indane compounds of formula I may be prepared in an analogous manner.

EXAMPLE 4

5,5'-Dihydroxy-6,6'-Di-(N-Diethylamino Ethoxy)-3,3,3',3'-Tetramethyl-1,1'-Bis-Spiro-Indane 20 g. of 5,6,5',6'-tetrahydroxy-3,3,3',3'-tetramethyl-1,1'-bis-spiro-indane are dissolved in 200 cc. of acetone. The following solutions are added drop by drop simultaneously to the resulting acetone solution from two dropping funnels while heating to boiling:

(1) Solution of 66 g. of potassium carbonate and 0.1 g. of sodium iodide in 100 cc. of water.
(2) Solution of 48.5 g. of diethylamino ethylchloride hydrochloride in 100 cc. of water.

After boiling for several hours, the crystalline basic diether 5,5'-dihydroxy-6,6'-di-(N-diethylamino ethoxy)-3,3,3',3'-tetramethyl-1,1'-bis-spiro-indane of the formula $C_{33}H_{50}N_2O_4$ and the melting point 191° C. is separated from the reaction mixture. Its dihydrochloride melts at 198° C.

In place of the bis-spiro-indane compounds used as the one reaction component in the preceding examples, there can be employed equimolecular amounts of other bis-spiro-indane compounds of Formula II such as:

5,6,5',6' - tetrahydroxy - 3,3,3',3' - tetramethyl - 4,7,4',7'-tetrachloro-1,1'-bis-spiro-indane;
5,6,5',6' - tetrahydroxy - 3,3,3',3' - tetramethyl - 4,7,4',7'-tetrabromo-1,1'-bis-spiro-indane;

while otherwise the procedure is the same as described in said examples.

In place of the esters of amino alcohols used as the other reaction component in the preceding examples, there can be employed equimolecular amounts of other esters of amino-alcohols of Formula III such as Diethylamino propylchloride;
Diethylamino isopropylchloride;
N-pyrrolidino ethylchloride;
N-piperidino ethylchloride;
N-piperazino ethylchloride;
$N_4$-methyl piperazino-$N_1$-ethylchloride;
N-hexamethylene-imino ethylchloride;
N-hexamethylene-imino ethylbromide;
N-hexamethylene-imino propylchloride;

while otherwise the procedure is the same as described in said examples.

The acid addition salts of the new basic ethers of the bis-spiro-indane compounds of Formula I are prepared in a manner known per se. For instance, the base is dissolved in a suitable solvent and the equimolecular amount of the respective acid is added thereto or, if the acid is a gas at room temperature, the gaseous acid is introduced into the solution. The acid addition salt either precipitates due to its insolubility in the solvent or it is recovered from its solution by evaporating the solvent, if required, in a vacuum. It is, of course, understood that only such acids are used for producing therapeutically useful salts which are tolerated by the human and animal body in the concentrations in which the salts are applied thereto and which do not react with and/or have any other detrimental effect upon the base.

The new basic ethers of the bis-spiro-indane compounds of Formula I, their acid addition salts, and their quaternary ammonium salts are highly effective as antihypertensive agents of prolonged activity. They are preferably administered orally in the form of tablets, pills, powders, capsules, solutions, emulsions, suspensions, dispersions, and in any other suitable form. They are preferably not used as such, but are diluted with suitable diluting agents, thus, allowing better and more economical use to be made thereof.

In the case of powders, fine, uniform dispersions of the new compounds within the diluting agent is of importance. Such a fine dispersion can be achieved, for instance, by mixing and milling the new compounds with a solid, pulverulent extending agent to the desired fineness, or by impregnating the already milled, finely powdered, solid carrier with a solution of the active compound in water, or a water-miscible solvent and then removing the water or solvent.

As solid carriers, which are suitable for the manufacture of useful pharmaceutical preparations, various inert pulverulent distributing agents as they are conventionally used in pharmaceutical compounding may be employed.

When preparing tablets, pills, powders, and the like the commonly used diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

In human therapy a single dose between about 1 mg. and about 20 mg. may be given. The preferred single dose is a dose of about 10 mg.

The following pharmacological tests have been carried out with the preferred compound, the 5,6,5',6'-tetra-(N-dimethylamino ethoxy)-3,3,3',3'-tetramethyl - 1,1' - bis-spiro-indane of Example 1.

The acute toxicity of said compound was determined in mice as $LD_{50}$, i.e. the dose killing 50% of the animals, as follows:

26.5 mg./kg. on intravenous administration,
150.0 mg./kg. on subcutaneous administation,
more than 500.0 mg./kg. on oral administration.

Intravenous administration of only 0.03 mg./kg. to dogs and cats produces a prolonged decrease of the blood pressure. On subcutaneous administration, the same effect is achieved by a dose of 0.5 mg./kg., on oral administration by a dose of 2 mg./kg. The blood pressure-decreasing effect of such minimum effective doses lasts, as an average, for 30 minutes to 60 minutes. When increasing the dose not only the intensity of the blood pressure-decreasing effect but also its duration are considerably increased. At the same time a decrease of the peripheral and elastic resistance of the blood vessels is observed without an increase in frequency. The rate of flow of the blood in the coronary vessels is also increased by administration of the tested compound. The increase in blood pressure which sets in after opening the occluded carotid, stimulation of the central end of the cut nervus vagus or, respectively, nervus ischiadicus, is substantially completely compensated by small doses of the tested compound. Likewise, the effect of veratrine upon the blood pressure which is due to its stimulating action on the sensible elements of the heart is eliminated to a large extent. The reaction due to administration of acetyl choline and the stimulation of the peripheral end of the cut nervus vagus are mitigated. Thus, the tested compound counteracts all those circulatory reactions which are the result of a stimulation of the central nervous system. When administering higher doses, the ganglionic transmission is restricted in its functions.

The tested compound itself has no effect on the nervus sympatheticus. The reactions caused by adrenalin, 1-arterenol, serotonin, tyramine, ephedrine, and tryptamine are not affected even on administration of larger doses thereof. The reaction caused by histamine is mitigated.

That the ganglionic transmission is blocked by the tested compound is proved furthermore by the suppression of those circulatory reactions which are released by 1,1-dimethyl-4-phenyl piperazinium (DMPP), by the administration of doses starting with 0.2 mg./kg. given intravenously.

Doses of at least 3.0 mg./kg. of the tested compound given orally several times daily to hypertensive rats favorably affected their blood pressure.

On oral administration of 20 mg./kg. of the tested compound daily to 10 male rats and 10 female rats for 12 weeks, no deviation of the weight curves and of feed consumption was observed in comparison to the same number of control animals. Neither the red nor the white blood corpuscles were affected and the differential blood count was not different from the normal blood count. No pathological changes were observed in the urine during the entire period of observation.

These pharmacological results prove that the tested compound has an excellent antihypertensive activity without any disadvantageous or obnoxious side-effects.

Of course, many changes and variations in the starting material and reactants, in the solvents, hydrogen halide-binding agents, and catalysts, in the reaction conditions, temperature, and duration, in the methods of working up the reaction mixture and of isolating and purifying the reaction products, in the methods of preparing, isolating, and purifying the acid addition salts and quaternary ammonium compounds of the reaction products, in the manner of administering the new compounds, and the like may be made by those skilled in the art in accordance with the principles set forth herein and in the claims annexed hereto.

The starting materials are prepared as will be described in the following examples:

EXAMPLE 5

*5,6,5',6'-Tetrahydroxy-3,3,3',3'-Tetramethyl-1,1'-Bis-Spiro-Indane*

200 g. of catechol are brought to reaction with 216 cc. of acetone, 455 cc. of glacial acetic acid and 364 cc. of concentrated hydrochloric acid by heating under reflux for 48 hours on the steam bath in an atmosphere of carbon dioxide. The reaction mixture is then allowed to crystallize by standing in an ice box for 12 hours. 196.5 g. of the crude crystals are recrystallized from boiling ethanol with a yield of 163.1 g.; M.P. 305° C. (corr. 310–313° C.) of the colorless pure product.

EXAMPLE 6

*6,6'-Dihydroxy-5,5'-Dimethoxy-3,3,3',3'-Tetramethyl-1,1'-Bis-Spiro-Indane*

In a similar way 48.5 g. of the above compound (M.P. 263–265° C.) are obtained from 300 g. of guaiacol, 285 cc. of acetone, 600 cc. of glacial acetic acid and 480 cc. of concentrated hydrochloric acid.

EXAMPLE 7

*5,6,5',6',-Tetrahydroxy-4,7,4',7'-Tetrachloro-3,3,3',3'-Tetramethyl-1,1'-Bis-Spiro-Indane*

60 g. of the product obtained according to Example 5 are suspended in 600 cc. of glacial acetic acid and chlorinated in a nitrogen atmosphere by introducing into the mixture 50 g. chlorine gas whereby the temperature rises from about 15° C. to 50° C. The mixture is then heated to boiling whereby a clear solution is obtained to which about 5 g. of decolorizing carbon are added. Thereafter the carbon is filtered hot. The crystals obtained after cooling the filtrate, are recrystallized from isopropanol. Yield: 70 g. of pure product, M.P. 242° C.

The acid addition salts of the new basic ethers of the bis-spiro-indane compounds of Formula I are obtainable as described above. Suitable acid components for the preparation of the acid addition salts are: hydrobromic acid, hydriodic acid, sulfuric acid, nitric acid, phosphoric acid, acetic acid, formic acid, oxalic acid, malonic acid, maleic acid, fumaric acid, succinic acid, citric acid, tartaric acid, malic acid, benzoic acid, salicyclic acid, p-amino benzoic acid, phthalic acid, isonicotinic acid, and others.

I claim:

1. 5,6,5',6' - tetra - (N - dimethylamino ethoxy)-3,3,3',3'-tetramethyl-1,1'-bis-spiro-indane.
2. 5,6,5',6' - tetra - (N-diethylamino ethoxy) - 3,3,3',3'-tetramethyl-1,1'-bis-spiro-indane.
3. 5,6,5',6' - tetra - (N - di - lower alkylamino lower alkoxy)-3,3,3',3'-tetramethyl-1,1'-bis-spiro-indane.
4. 5,6,5',6' - tetra - (N - morpholino ethoxy)3,3,3',3'-tetramethyl-1,1'-bis-spiro-indane.
5. 5,6,5',6' - tetra - (N - diethylamino ethoxy) - 2,3,3'-trimethyl-3,3'-diethyl-1,1'-bis-spiro-indane.
6. 5,5' - dihydroxy - 6,6' - di - (N - diethylamino ethoxy)-3,3,3',3'-tetramethyl-1,1'-bis-spiro-indane.
7. 5,5' - dihydroxy - 6,6' - di - (N - di - lower alkylamino lower alkoxy)-3,3,3',3'-tetramethyl-1,1'-bis - spiro-indane.
8. 5,6,5',6' - tetra - (N - diethyl - N - benzyl ammonium ethoxy) - 3,3,3',3' - tetramethyl - 1,1' - bis - spiro-indane tetrachloride.
9. The bis-spiro-indane compound selected from the group consisting of the basic ether of the 1,1'-bis-spiro-indane compound of the formula

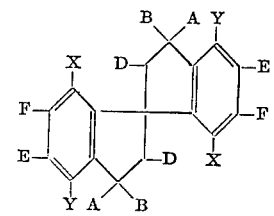

wherein
A and B are lower alkyl,
X and Y are members selected from the group consisting of hydrogen, chlorine, and bromine;
D is a member selected from the group consisting of hydrogen and lower alkyl; and
E and F are members selected from the group consisting of lower alkyl, hydroxyl, lower alkoxy, and at least one pair of the E and F substituents in each indane half of the bis-spiro-indane molecule being an amino alkoxy group of the formula

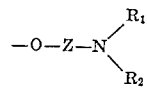

wherein
Z is a lower alkylene; and
$R_1$ and $R_2$ are members selected from the group consisting of lower alkyl and $R_1$ and $R_2$, together with the nitrogen atom to which they are attached, forming a mononuclear heterocyclic ring selected from the group consisting of the pyrrolidine, piperidine, piperazine, morpholine ring, and such lower alkyl substituted rings,
the corresponding members A, B, X, Y, E, and F in each indane half of the bis-spiro-indane molecule being identical,
its acid addition salts with pharmaceutically acceptable acids, and its quaternary ammonium compounds with a member selected from the group consisting of benzyl halogenide, lower alkyl halogenide, dimethyl sulfate, and p-toluene sulfonic acid lower alkyl ester.

References Cited in the file of this patent

FOREIGN PATENTS 1,092,648      Germany _____ Nov. 10, 1960